United States Patent
Ichinari et al.

(10) Patent No.: US 6,533,206 B2
(45) Date of Patent: Mar. 18, 2003

(54) DEVICE FOR WINDING REMAINING LINE OF OPTICAL FIBER CABLE

(75) Inventors: Masahiro Ichinari, Gyoda (JP); Syuichi Hagiwara, Gyoda (JP); Hisanari Shibazaki, Kasukabe (JP)

(73) Assignees: Toyokuni Electric Cable Co., Ltd., Tokyo (JP); MMP Co., Ltd., Saitama (JP)

(*) Notice: Subject to any disclaimer, the term of this patent is extended or adjusted under 35 U.S.C. 154(b) by 0 days.

(21) Appl. No.: 09/840,599

(22) Filed: Apr. 23, 2001

(65) Prior Publication Data

US 2002/0153445 A1 Oct. 24, 2002

(51) Int. Cl.[7] ............................................... B65H 75/40
(52) U.S. Cl. .................................................. 242/388.1
(58) Field of Search ........................ 242/388.1, 388.2, 242/388.3, 388.4, 388.5, 378.1, 378.2, 378.3, 388.6

(56) References Cited

U.S. PATENT DOCUMENTS

| | | | | | |
|---|---|---|---|---|---|
| 3,809,331 | A | * | 5/1974 | Gaul | 242/388.1 |
| 4,901,938 | A | * | 2/1990 | Cantley et al. | 242/378.1 |
| 5,351,907 | A | * | 10/1994 | Hartmann | 242/388.1 |
| 5,588,626 | A | * | 12/1996 | Yang | 242/378.1 |
| 5,779,175 | A | * | 7/1998 | Shirahase | 242/388.1 |
| 6,065,708 | A | * | 5/2000 | Matsubara | 242/388.1 |
| 6,349,893 | B1 | * | 2/2002 | Daoud | 242/378.3 |
| 6,405,961 | B1 | * | 6/2002 | Mastrangelo | 242/378.1 |

* cited by examiner

Primary Examiner—John M. Jillions
(74) Attorney, Agent, or Firm—Jordan and Hamburg LLP

(57) ABSTRACT

A device for winding the remaining line of the optical fiber cable easily when wiring without lose the characteristics of the optical fiber cable. The device includes a case body having an insertion aperture, an inner drum, and a pair of outer drums for receiving cable wound thereabout. The inner drum includes an upper flange, a lower flange, and a pair of guide drums disposed between the upper flange and the lower flange.

21 Claims, 13 Drawing Sheets

DEVICE FOR WINDING REMAINING LINE OF OPTICAL FIBER CABLE

BACKGROUND OF THE INVENTION

The present invention is related to a device for winding the remaining line of an optical fiber cable, which is produced at the time of the optical fiber cable is wound.

The conventional winding device for the remaining line of an electric wire is composed of a case body in the shape of a box; a hole for insertion of the electric wire thereinto, formed in the central upper surface and through both-side-walls so as to insert the electric wire such that the electric wire passes through inside the case; and an electric wire winding drum mounted rotatably into the case, having an electric wire insertion slot at a central part thereof, corresponding with the insertion hole.

When the conventional device winds the remaining line of the optical fiber cable, since the winding part to the perimeter part of an electric wire winding drum is bent by the acute angle from the electric wire insertion slot of the electric wire winding drum, the characteristic of the optical fiber cable is spoiled and there is a fault that it could not be used.

SUMMARY OF THE INVENTION

Accordingly, it is an object of the present invention to provide the device for winding a remaining line of the optical fiber cable which can wind easily the remaining line of the optical fiber cable without spoiling the characteristic of the optical fiber cable, produced at the time of wiring.

The novel features which are believed to be characteristic of the invention, both as to its organization and method of operation, together with further objects and advantages thereof, are described below with reference to the accompanying drawings in which a presently preferred embodiment of the invention is illustrated as an example.

It is to be expressly understood, however, that the drawings are for the purpose of illustration and description only, and are not intended as a definition of the limits of the invention.

DETAILED DESCRIPTION

Figure 1:
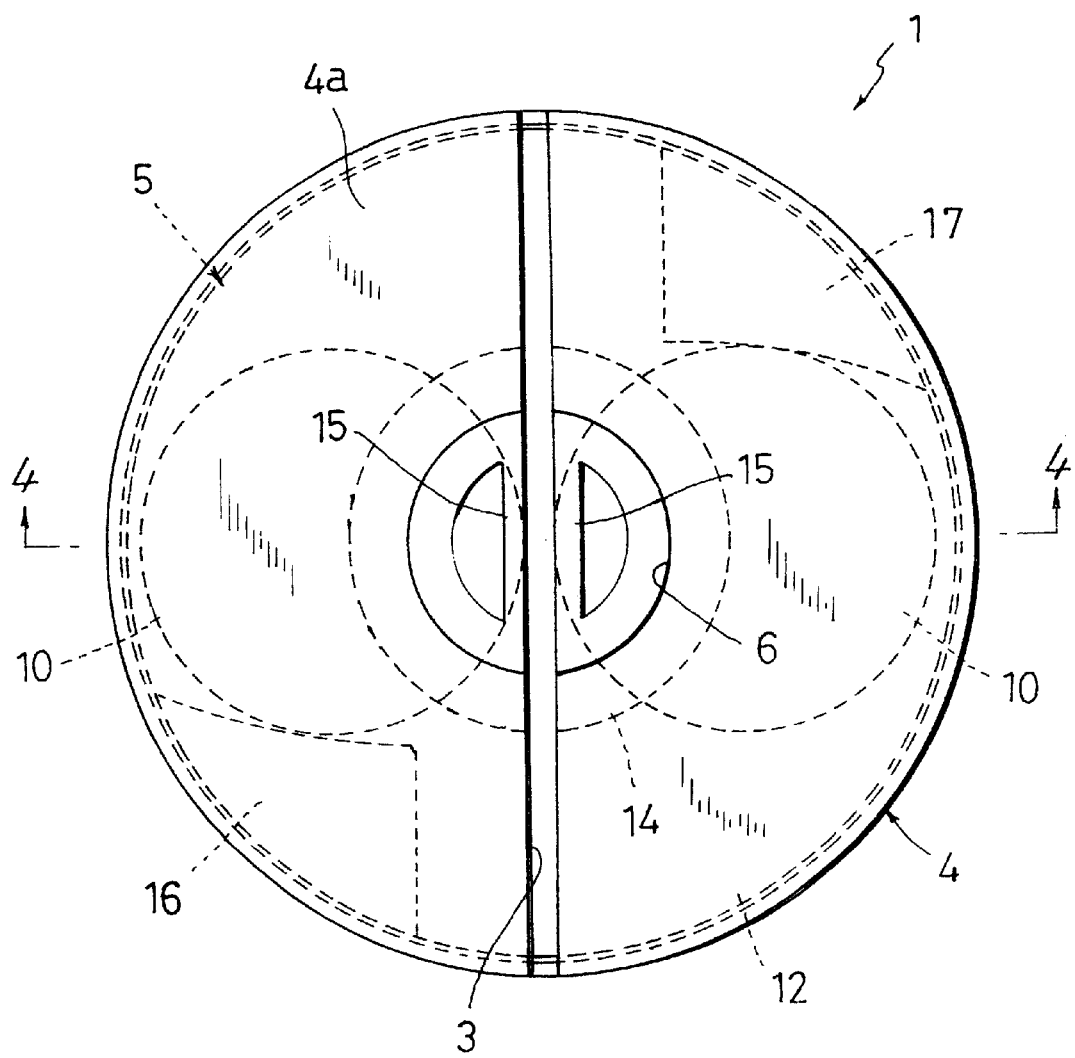
FIG. 1 is a plan view showing a first embodiment of the present invention.
Figure 2:
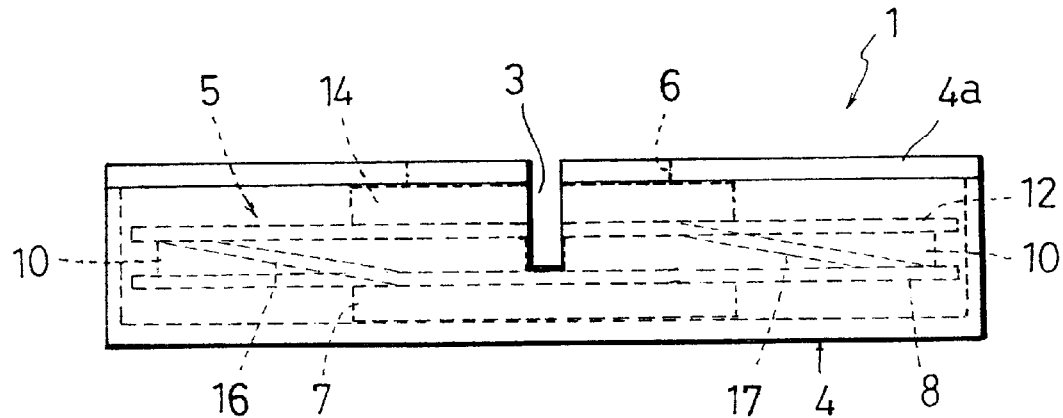
FIG. 2 is a front view showing the first embodiment of the present invention.
Figure 3:
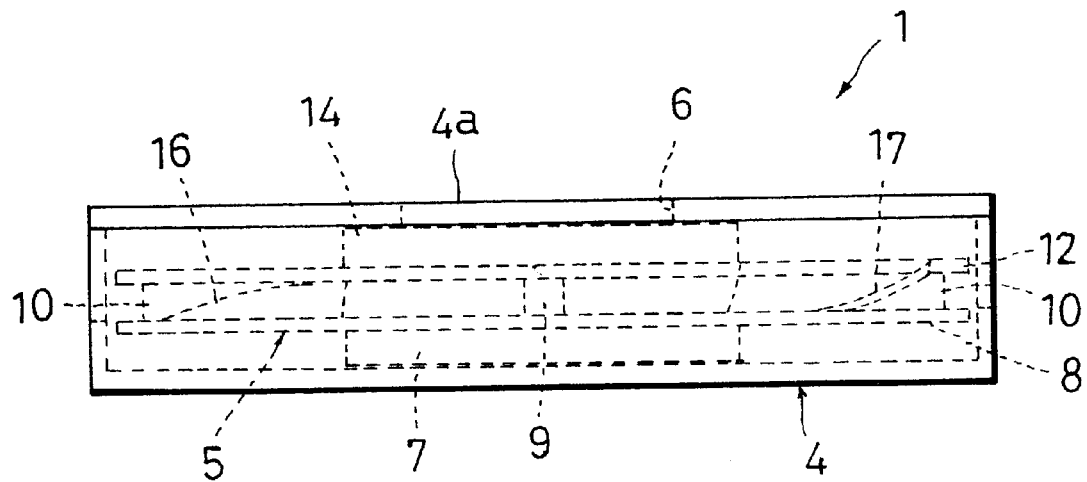
FIG. 3 is a side view showing the first embodiment of the present invention.
Figure 4:
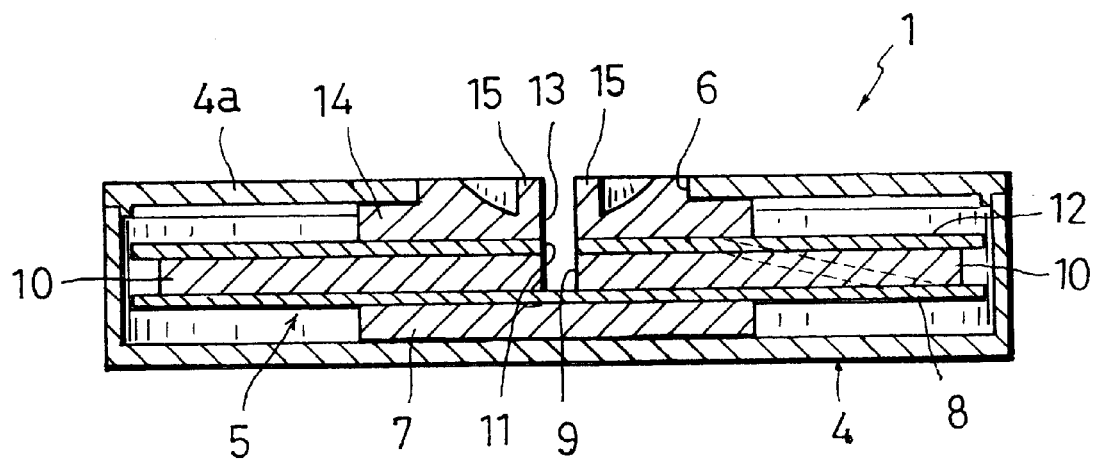
FIG. 4 is a cross sectional view taken along a line 4 4 of FIG. 1.
Figure 5:
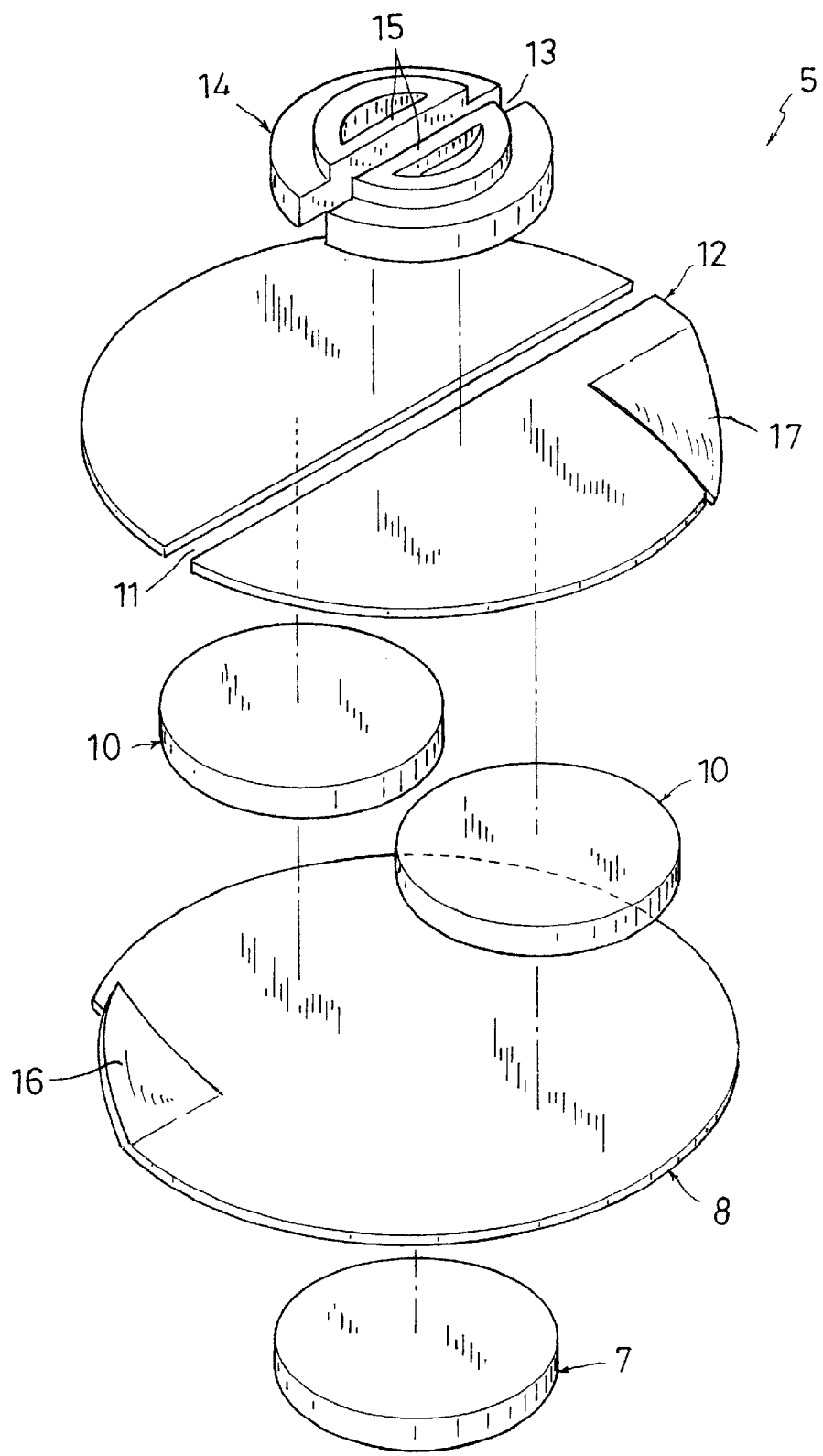
FIG. 5 is an exploded perspective view of a drum for winding remaining line of the optical fiber cable.
Figure 6:
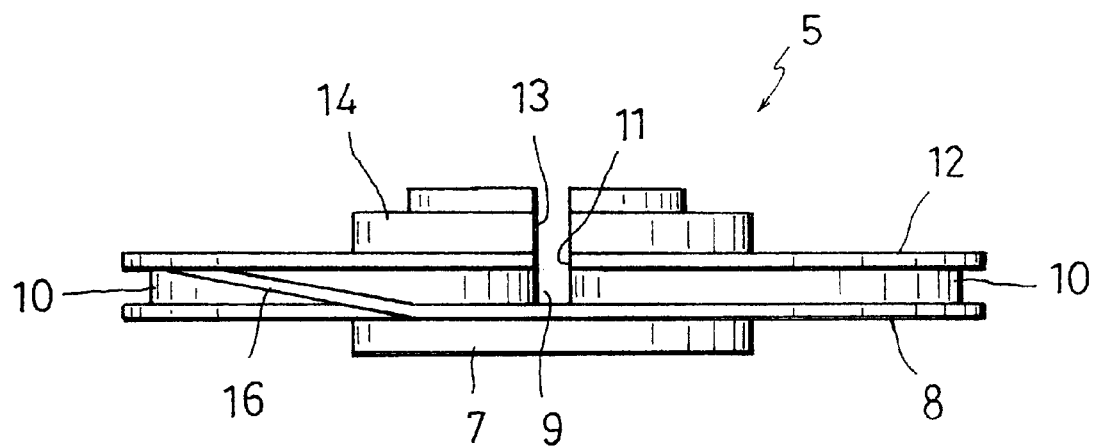
FIG. 6 is a front view of a drum for winding remaining line of the optical fiber cable.
Figure 7:
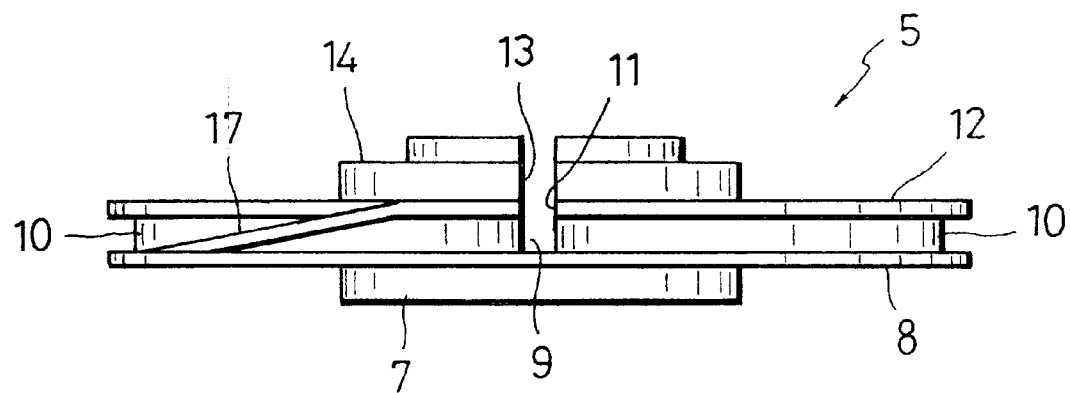
FIG. 7 is a back view of a drum for winding remaining line of the optical fiber cable.
Figure 8:
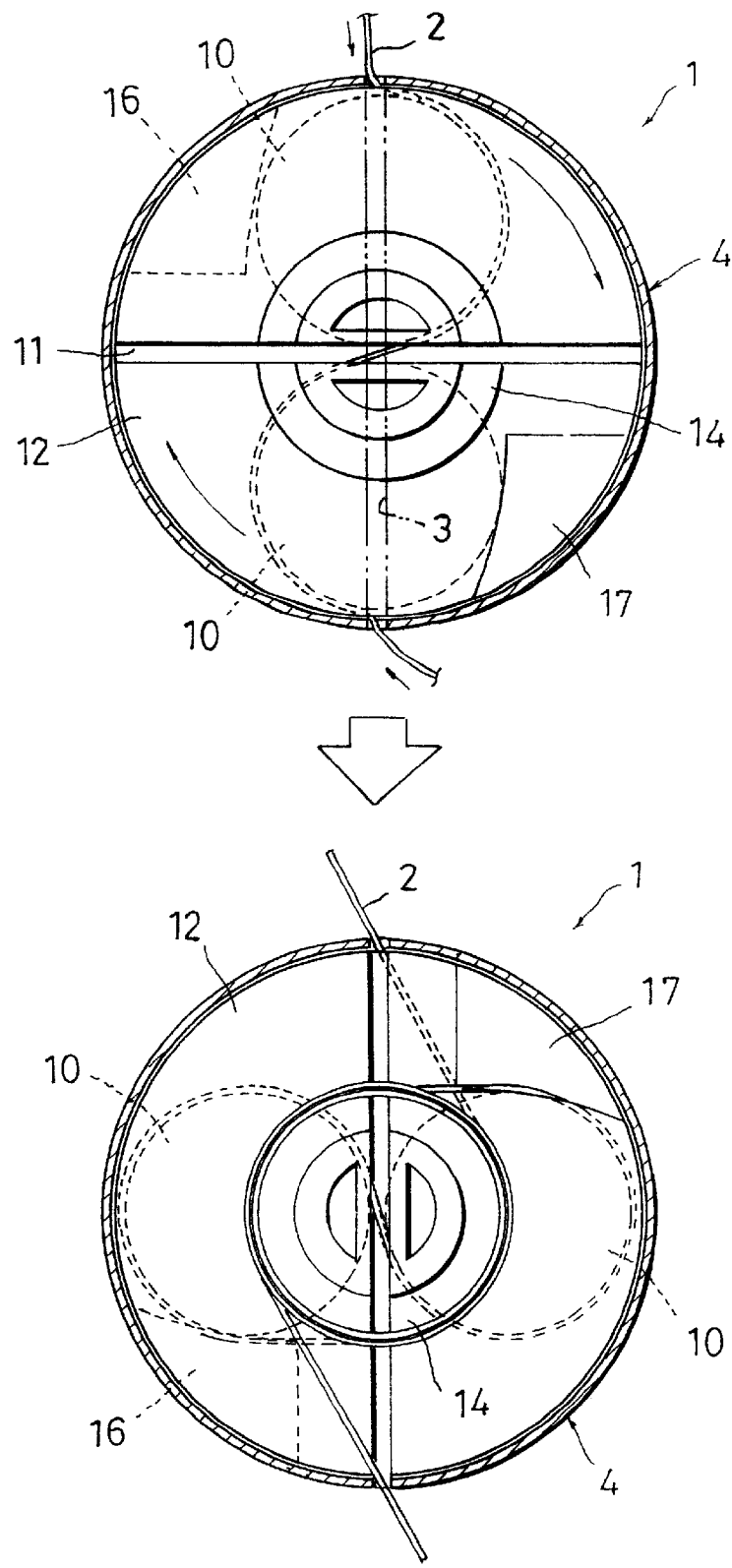
FIG. 8 is an explanation view showing a condition of winding of the first embodiment of the present invention.

Preferred embodiments of the present invention are described in more detail below referring to the accompanying drawings.

An understanding of the present invention may be best gained by reference FIGS. 1 to 8. FIGS. 1 to 8 illustrate a winding device of a first embodiment of the present invention.

A winding device 1 winds a remaining line of an optical fiber cable 2 wired and includes a case body 4 and a drum 5 that winds the remaining line thereof.

The case body 4 has an insertion hole 3 for insertion of the optical fiber cable 2 thereinto, the insertion hole is formed at a central portion of an upper surface and through both side-walls of the case body 4.

The drum 5 is mounted rotatably into the case body 4, capable of winding the remaining line of the optical fiber cable 2 so as to not spoil the characteristic of the optical fiber cable 2.

In addition, the case body 4 is formed in the shape of a disk, and a through hole 6 is formed with a central part of an upper surface board 4a of the case body 4.

The drum 5 further includes a winding drum 7, a lower flange 8, a pair of guide drums 10,10, an upper flange 12, a second winding drum 14, knobs 15,15, and a lower guide 16 and an upper guide 17.

The diameter with the winding drum 7 is at 60 mm or more; the diameter of the lower flange 8 at 120 mm or more; the diameter of each of the guide drums 10 and 10 at 60 mm or more; the diameter of the upper flange 12 at 120 mm or more; and the diameter of the winding drum 14 at 60 mm or more.

The winding drum 7 allows the remaining line of the optical fiber cable to be rolled around it so that the characteristic of the optical fiber cable 2 is not spoiled.

The lower flange 8 is fixed to the upper surface of the winding drum 7 in the central portion of the winding drum 7.

The guide drums 10,10 are fixed to the upper surface of the lower flange 8 through interval 9.

The upper flange 12 is fixed so as to cover an upper part of the guide drums 10, 10, the upper flange 12 having a hole 11 for insertion of the optical fiber cable thereinto.

The winding drum 14 for rolling the remaining line of the optical fiber cable 2 around it is fixed to an upper surface of the upper flange 12, the winding drum 14 having a hole 13 for insertion of the optical fiber cable thereinto and corresponding to the hole 11.

The knobs 15,15 are formed integrally at the end portion of the hole 13 except for the portion of the outer circumferential part of the winding drum 14 so as to project upwardly.

The lower guide 16 and the upper guide 17 are formed in the outer circumferential portion of the lower flange 8 and upper flange 12. Additionally, the guides guide one of the remaining lines of the optical fiber cable 2 to the winding drum 7 and the other remaining line of the optical fiber cable 2 to the winding drum 14.

The winding device 1 of the present invention allows the center portion of the remaining line of the wiring optical fiber cable 2 to be located in the recess 9 between the guide drums 10,10 after it passes through the insertion hole and the drum 14, and the holes 13,11.

After that, by rotating the knobs 15,15, the optical fiber cable 2 is wound around the guide drums 10,10, the remaining line of the optical fiber cable 2 is wound around the winding drum 7 and the winding drum 14 by action of the lower guide 16 and upper guide 17.

In addition, the wound optical fiber cable 2 can be taken outwardly by reverse-rotating the drum 5.

Other embodiments of the present invention will now be described referring to FIGS. 9 to 20. Through the drawings of the embodiments, like components are denoted by like numerals as of the first embodiment and will not be further explained in great detail.

Figure 9:
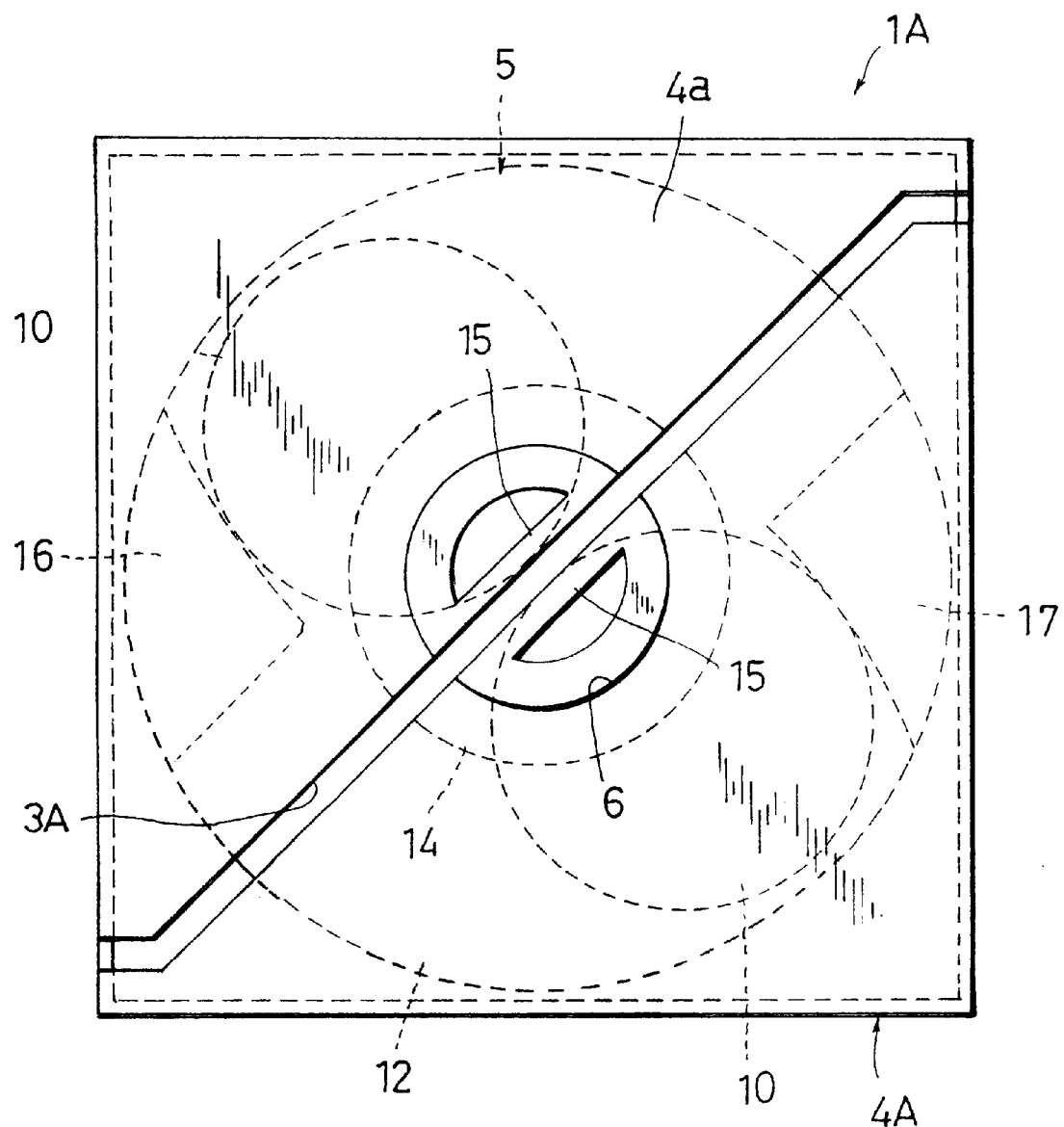
FIG. 9 is a plan view showing a second embodiment of the present invention.
Figure 10:
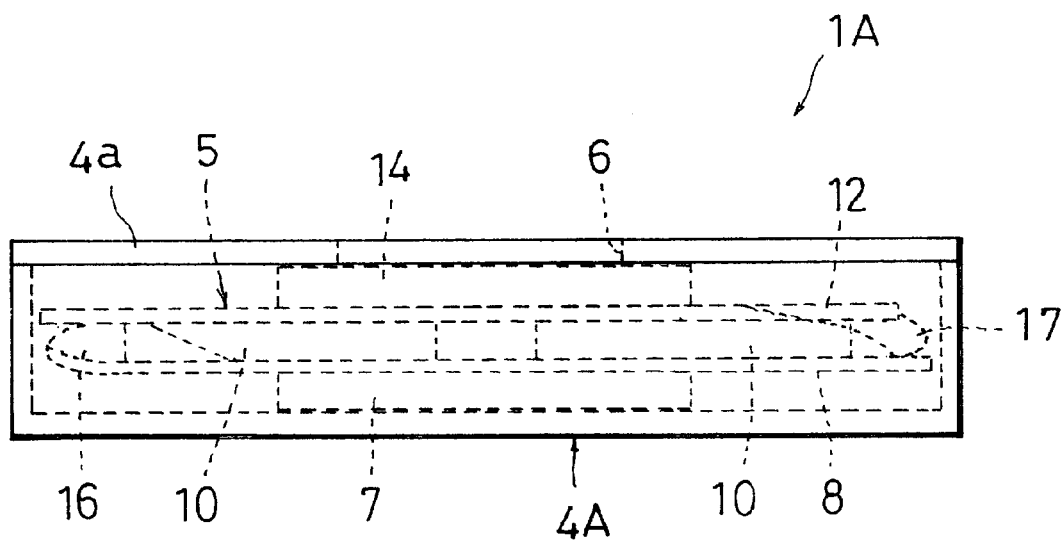
FIG. 10 is a front view showing the second embodiment of the present invention.
Figure 11:
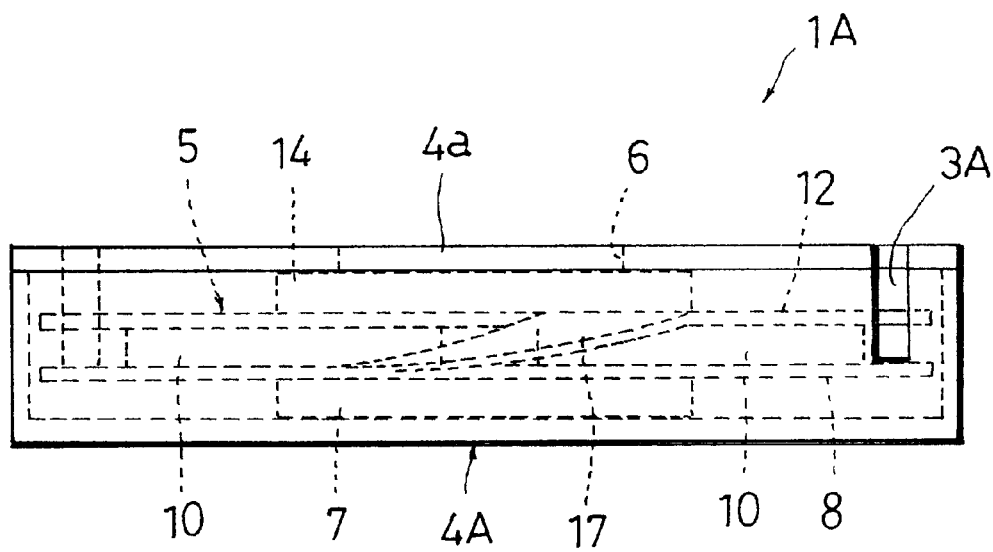
FIG. 11 is a side view showing the second embodiment of the present invention.

A second embodiment of the present invention is shown in FIGS. 9 to 11. It is distinguished from the first embodiment by the fact that the case body 4 is replaced from another case body 4A and an insertion hole 3A is formed in the shape of a diagonal line. The case body 4A is formed in the shape of a box. A winding device 1A with the case body 4A according to the second embodiment has similar advantages to that according to the first embodiment.

Figure 12:
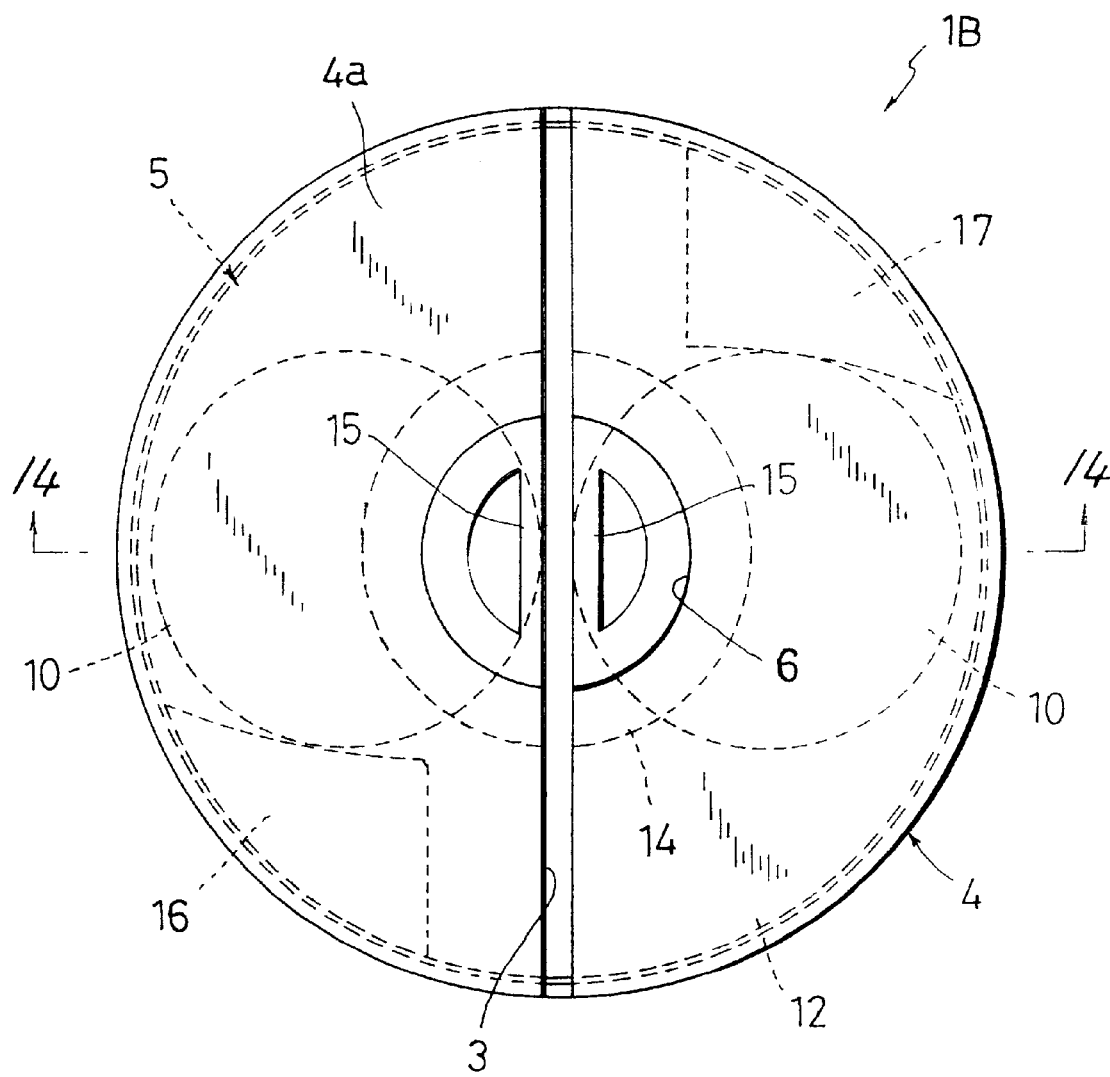
FIG. 12 is a schematic circuit diagram showing the third embodiment of the present invention.
Figure 13:
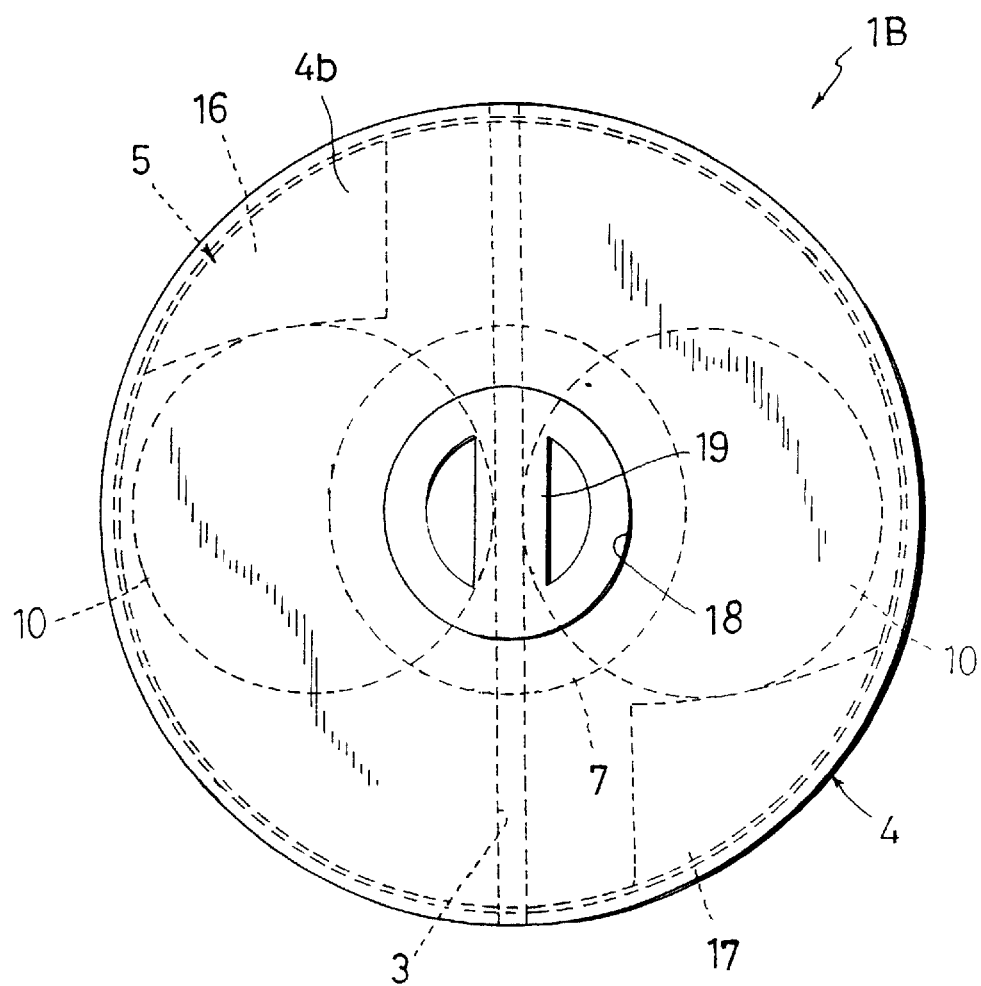
FIG. 13 is a bottom view showing the third embodiment of the present invention.
Figure 14:
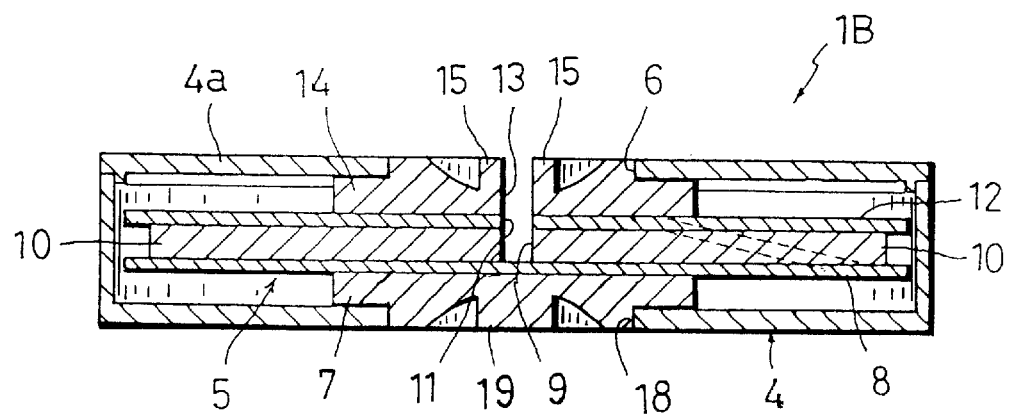
FIG. 14 is a cross sectional view taken a line 14 14 of FIG. 12.

A third embodiment of the present invention is shown in FIGS. 12 to 14. It is distinguished from the first embodiment by the fact that a through hole 18 is formed in a central part of a bottom board 4b of the case body 4, and a knob 19 as a rotation member is formed with the winding drum 7. A winding device 1B in this way according to the second embodiment has similar advantages to that according to the first embodiment.

Figure 15:
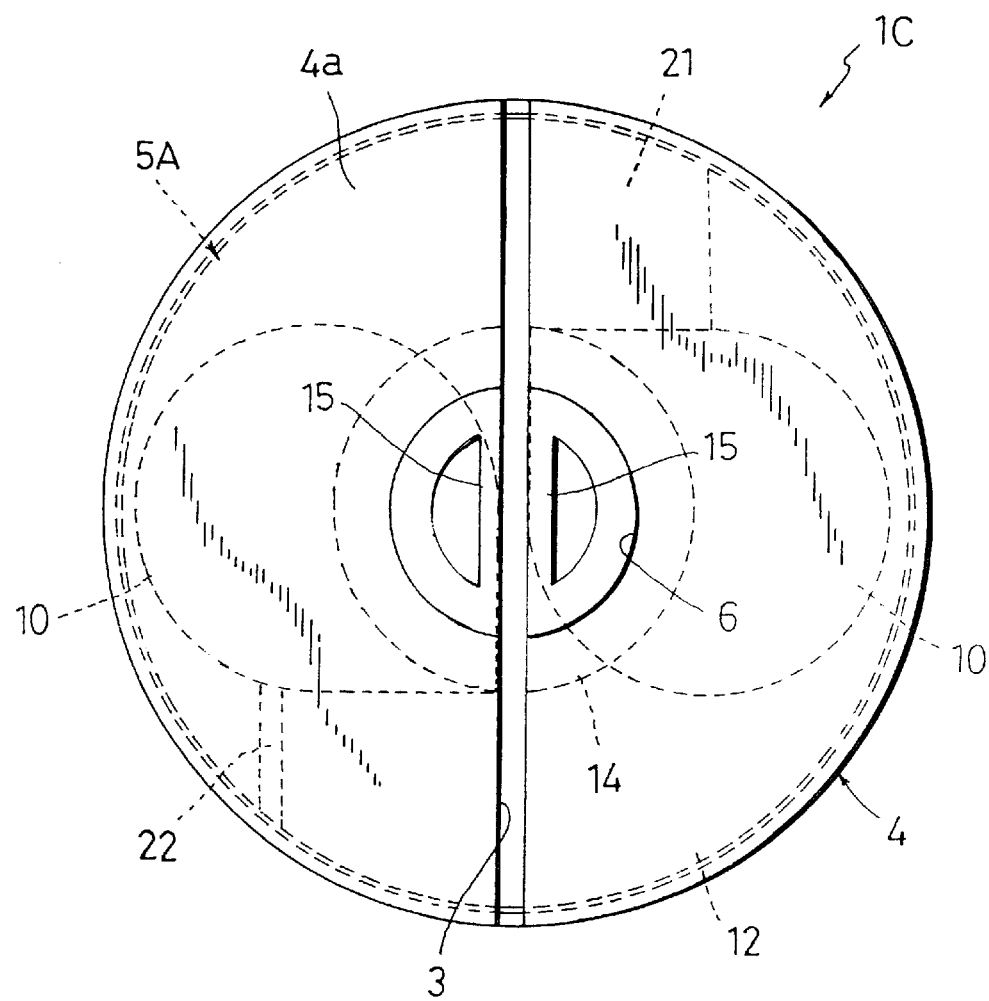
FIG. 15 is a plan view showing a fourth embodiment of the present invention.
Figure 16:
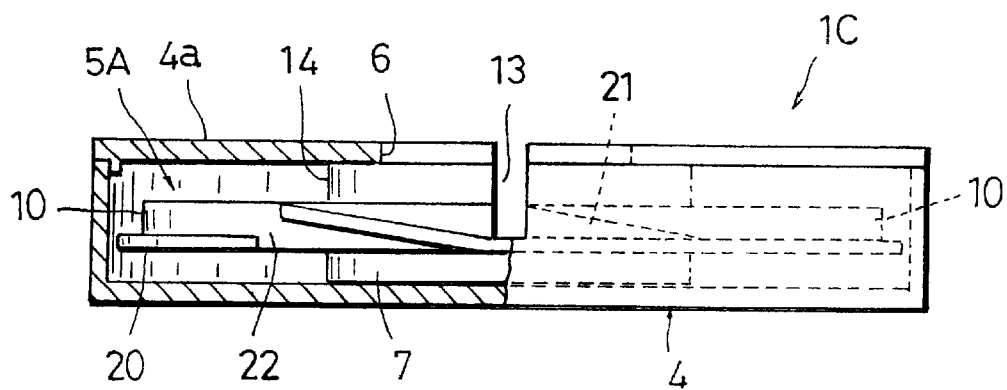
FIG. 16 is a partially broken front view showing the fourth embodiment of the present invention.
Figure 17:
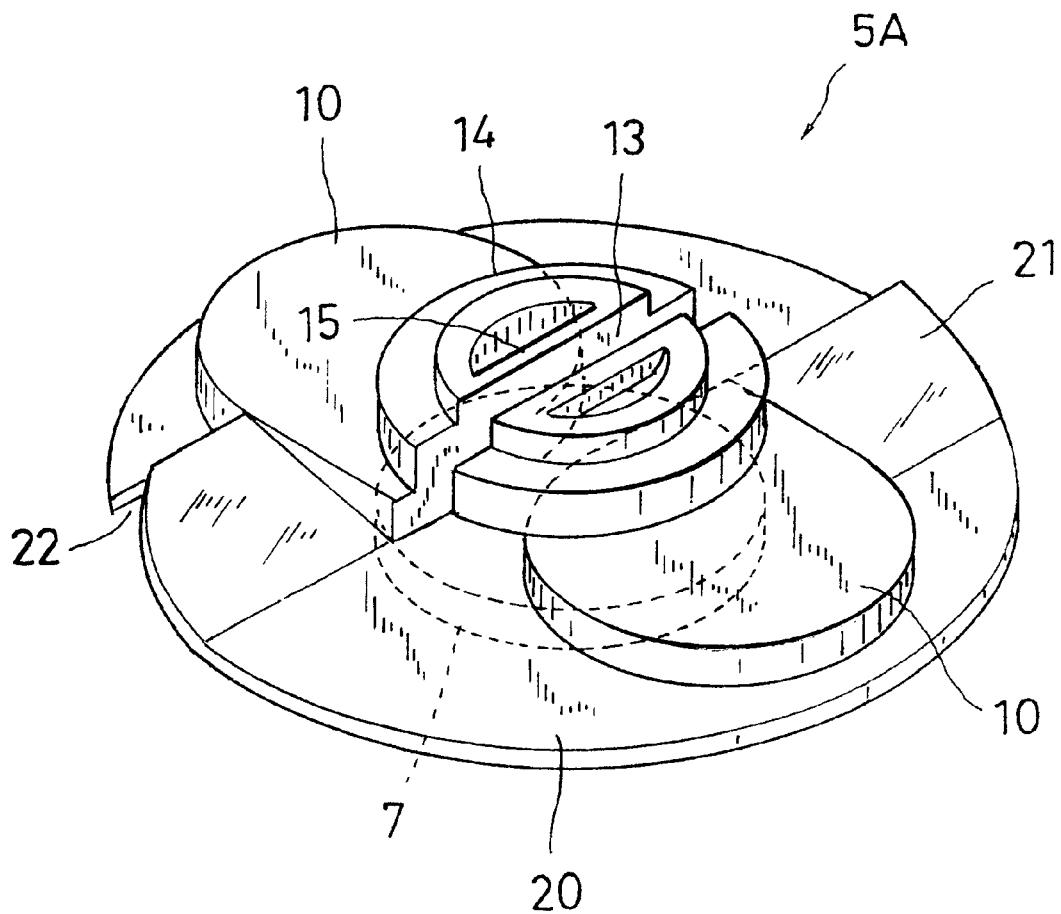
FIG. 17 is a perspective view of a drum for winding remaining line of the optical fiber cable.

A fourth embodiment of the present invention is shown in FIGS. 15 to 17. It is distinguished from the third embodiment by the fact that the winding drum 7 is fixed or formed integrally in the central part of the bottom surface of a rotation flange 20, and the drum 5 is replace with another drum 5A. The drum 5A includes the guide drums 10,10, the drum 14 and a guide piece 21 and guiding portion 22; the guide drums 10,10 fixed or formed integrally on an upper surface of the rotation flange 20; the drum 14 fixed or formed integrally on an upper surface of the rotation flange 20 and having a insertion hole 13 corresponding to the intervals between the flange drums 10; and the guide piece 21 and guiding portion 22 guiding the remaining line of the optical fiber cable 2 to the drums 7 and 14 from the drums 10,10. A winding device 1C in this way according to the second embodiment has similar advantages to that according to the first embodiment and the number of parts is reducible.

Figure 18:
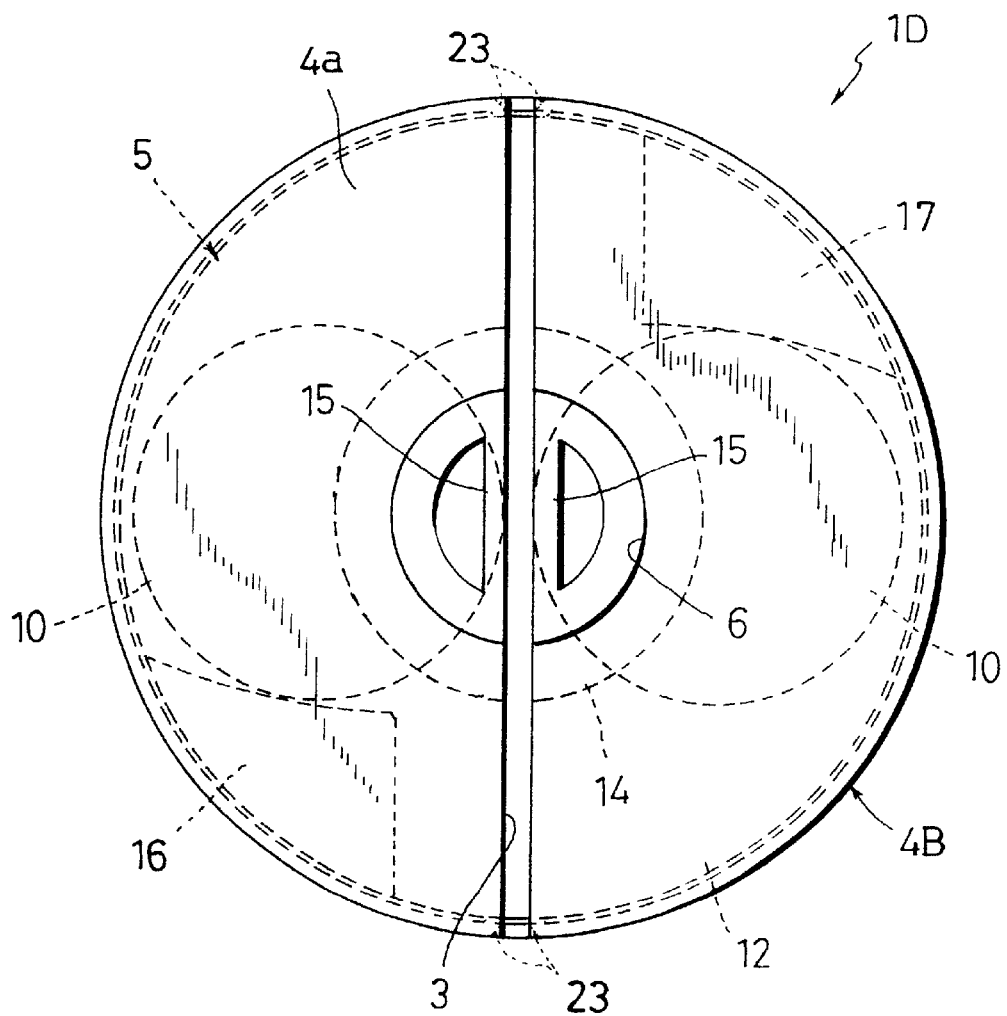
FIG. 18 is a plan view showing a fifth embodiment of the present invention.
Figure 19:
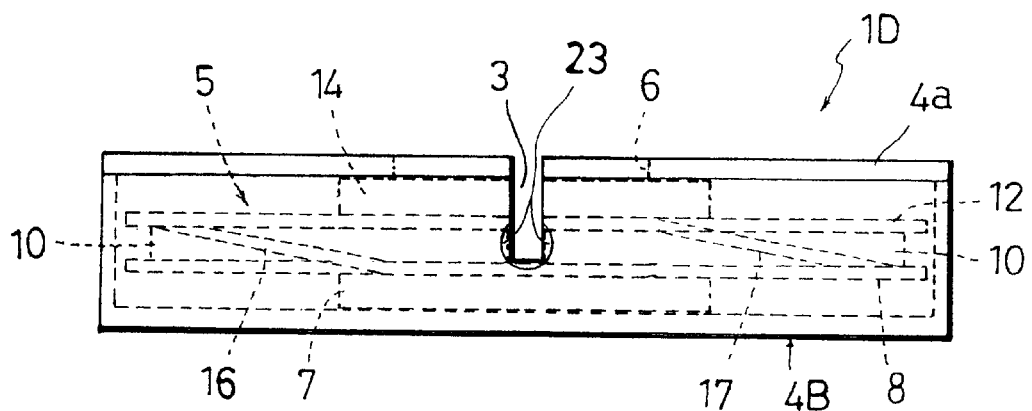
FIG. 19 is a front view showing the fifth embodiment of the present invention.
Figure 20:
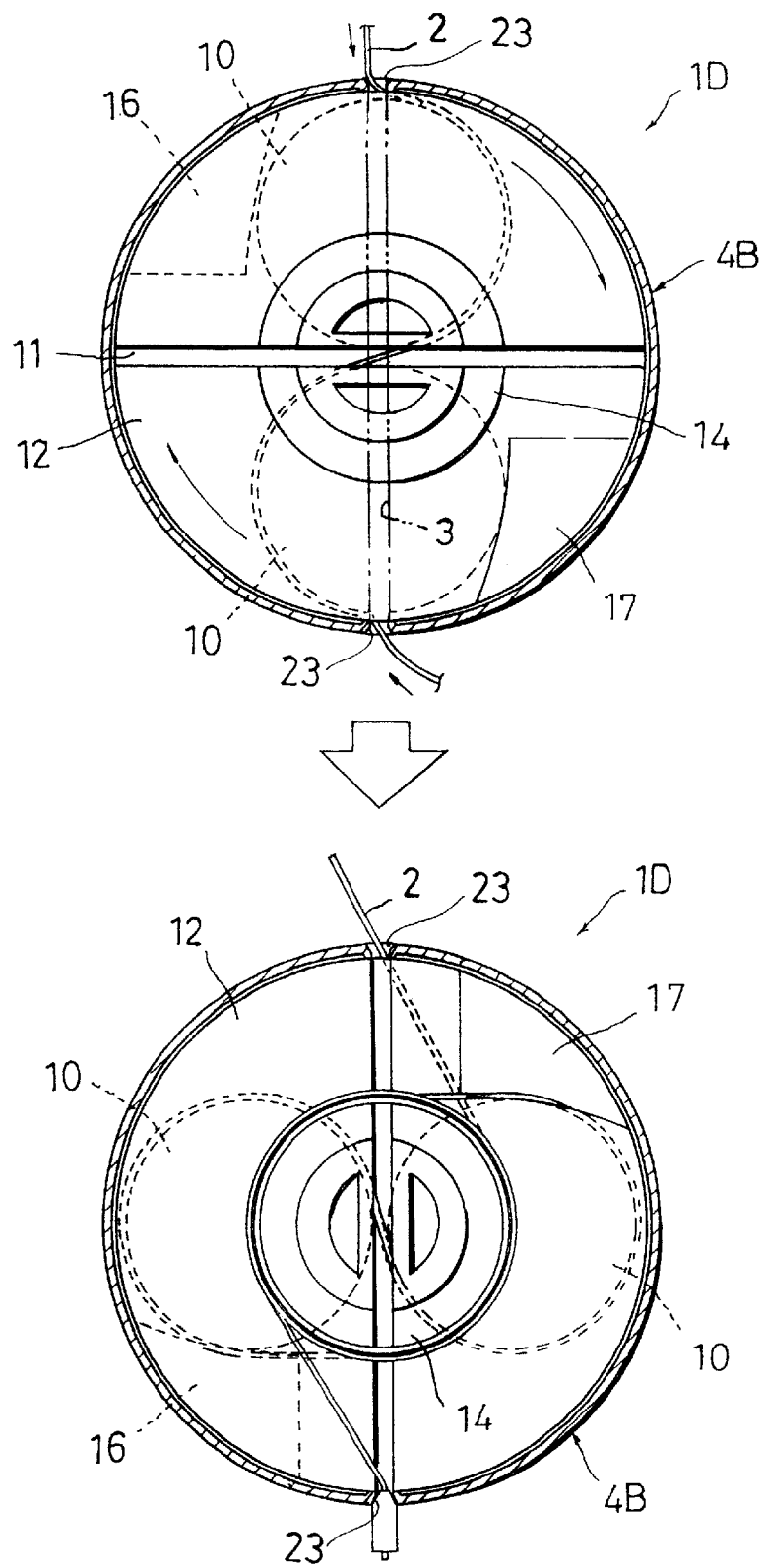
FIG. 20 is an explanation view showing a condition of winding of the fifth embodiment of the present invention.

A fifth embodiment of the present invention is shown in FIGS. 18 to 20. It is distinguished from the third embodiment by the fact that the case body 4 is replaced from another case body 4B formed in the shape of a box, the case body 4B having concave portions 23,23 for receiving an optical connector provided at the both side walls of the insertion hole 3. The optical connector of the optical fiber cable wound can be contained the concave portion 23,23 of a case body 4B. In addition, the concave portion 23,23 formed in the case body 4B may be formed in one sidewall of the insertion hole 3.

In addition, in each of embodiments of the present invention, although the drum 5 is rotated by hand, the drum 5 may be wound automatically by using a swirl spring etc. when winding. In this case, the torque of a swirl spring allows to lock and to lock release.

As set forth above, the advantages of the invention are as follows:

(1) A winding device of remaining line in optical fiber cable includes a case formed in the shape of a box; an insertion hole provided substantially at a central portion of an upper surface and through both side-walls so as to insert the remaining portion of the optical fiber cable thereinto so that it pass through the case; a winding drum for winding the remaining line of the optical fiber cable provided rotatably into the case so that the optical fiber cable can be wound with a bend in a condition that it is not harmful to the characteristic of the optical fiber cable; the winding drum further including: a lower flange fixed to an upper part of the drum, having a guide part at an outer circumferential portion thereof; a pair of guide drums fixed to an upper part of the lower flange through the intervals; an upper flange fixed so as to cover an upper part of the guide drums, having an insertion hole at a central part thereof and guide post at an outer circumferential portion thereof in order to guide the optical fiber cable upwardly; a second drum fixed to an upper surface of the upper flange, having an insertion hole which corresponds to the insertion hole of the upper flange; and a rotation implement that rotates one of the winding drums from the outside of the case body. Accordingly, the remaining portion of the wired optical fiber cable can be wound with a bend in a condition that it is not harmful to the characteristic of the optical fiber cable.

Therefore, while the wiring of the optical fiber cable can be performed comfortably without caring about the remaining portion, the wiring can be arranged finely.

(2) As discussed above, since the optical fiber cable can be wound with a bend in a condition that it is not harmful to the characteristic of the optical fiber cable only by rotating the drum, it can be used safely and easily by anyone.

(3) As discussed above, since the central part of the remaining portion of the optical fiber cable can be wound only by inserting in the recess and rotating it, attachment is easy and can be done simply.

What is claimed is:

1. A winding device of remaining line in optical fiber cable comprising:
   a case formed in the shape of a box;
   an insertion hole provided substantially in a central portion of an upper surface and through both sidewalls of the case so as to insert the remaining portion of the optical fiber cable so that it passes through the case;
   a winding drum for winding the remaining line of the optical fiber cable provided rotatably into the case so that the optical fiber cable can be wound with a bend in a condition that it is not harmful to the characteristic of the optical fiber cable;
   the winding drum further including:

a lower flange fixed to an upper part of the winding drum, having a guide part at an outer circumferential portion thereof;

a pair of guide drums fixed to an upper part of the lower flange;

an upper flange fixed so as to cover an upper part of the guide drums, having an insertion hole at a central part thereof and a guide post at an outer circumferential portion thereof in order to guide the optical fiber cable upwardly;

a second winding drum fixed to an upper surface of the upper flange, having an insertion hole which corresponds to the insertion hole of the upper flange; and a rotation implement that rotates one of the winding drum and the second winding drum from outside of the case body.

2. A device for winding remaining line in the optical fiber cable according to claim 1, wherein the winding drum has a diameter of 60 mm or more; the lower flange has a diameter of 120 mm or more; the pair of guide drums each have a diameter of 60 mm or more; the upper flange has a diameter of 120 mm or more; and the second winding drum has a diameter of 60 mm or more.

3. A device for winding remaining line in the optical fiber cable according to claim 1, wherein the lower flange winds the remaining line of the optical fiber cable; the winding drum is provided at a central portion of a bottom portion of the lower flange; and the second winding drum is provided at a central portion of an upper portion of the upper flange.

4. A device for winding cable comprising:

a case body having an insertion aperture;

an inner drum rotatably mounted in said case body for receiving a portion of said cable and deflecting said portion of said cable in opposite directions;

said inner drum including:

an first flange;

a second flange; and a pair of guide drum bodies connecting the first flange and the second flange between and around which said cable passes; and a pair of outer drums disposed on opposing sides of the inner drum for receiving said cable from said inner drum and winding said cable thereabout from opposing directions, wherein the inner drum and the pair of outer drums are rotatably received by the case body.

5. A device for winding cable according to claim 4, further comprising:

said first flange having a guide portion for guiding said cable toward one outer drum of said pair of outer drums; and said second flange having a guide portion for guiding said cable toward another outer drum of said pair of outer drums.

6. A device for winding cable according to claim 4, further comprising said first flange having a guide portion for guiding said cable toward one outer drum of said pair of outer drums.

7. A device for winding cable according to claim 4, further comprising said first flange having an insertion aperture for receiving said cable.

8. A device for winding cable according to claim 7, wherein said guide drum bodies receive said cable at an interval between said guide drum bodies.

9. A device for winding cable according to claim 4, wherein the diameter of the first flange is 120 mm or more.

10. A device for winding cable according to claim 4, wherein the diameter of the each inner drum is 60 mm or more.

11. A device for winding cable according to claim 10, wherein the diameter of the first flange is 120 mm or more.

12. A device for winding cable according to claim 4, wherein the first flange and the second flange have a common central axis.

13. A device for winding cable according to claim 4, further comprising one outer drum of the pair of outer drums having an insertion aperture.

14. A device for winding cable according to claim 4, further comprising a rotation implement fixed to one outer drum of the pair of outer drums.

15. A device for winding cable according to claim 4 wherein one outer drum of the pair of outer drums has a diameter of 60 mm or more.

16. A device for winding cable according to claim 4 wherein each outer drum of the pair of outer drums has a diameter of 60 mm or more.

17. A device for winding cable according to claim 4 wherein each outer drum of the pair of outer drums has a common axis.

18. A device for winding cable according to claim 4, wherein the case body is rectangular and the insertion aperture of the case body is in the shape of a diagonal line with end regions reaching opposites sides of the case body.

19. A device for winding cable according to claim 4, further comprising a second aperture formed in a bottom surface of the case body.

20. A device for winding cable according to claim 4, wherein the case body has concave portions.

21. A device for winding cable according to claim 4, wherein one outer drum of the pair of outer drums is integral with the inner drum.

* * * * *